(12) United States Patent
Sankaranaraynan et al.

(10) Patent No.: US 8,509,417 B1
(45) Date of Patent: Aug. 13, 2013

(54) ENHANCED CALL ON-HOLD SERVICES

(75) Inventors: Pallavur Sankaranaraynan, Overland Park, KS (US); Lyle Walter Paczkowski, Mission Hills, KS (US); Sean Alan Isaacson, Raymore, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1554 days.

(21) Appl. No.: 12/046,704

(22) Filed: Mar. 12, 2008

(51) Int. Cl.
*H04M 3/00* (2006.01)
*H04M 5/00* (2006.01)

(52) U.S. Cl.
USPC ............ 379/265.09; 379/209.01; 379/210.01; 379/265.11; 379/266.01; 379/93.35; 455/414.1; 455/417; 455/445

(58) Field of Classification Search
USPC .................. 379/93.35, 93.09, 215.01, 209.01, 379/210.01, 265.01, 265.02, 265.09, 265.11, 379/266.01, 242, 272, 273; 455/414.1, 417, 455/445; 348/14.01–14.16
See application file for complete search history.

(56) References Cited

U.S. PATENT DOCUMENTS

| | | | |
|---|---|---|---|
| 5,757,781 A | 5/1998 | Gilman et al. | |
| 6,178,240 B1 * | 1/2001 | Walker et al. | 379/266.01 |
| 6,259,786 B1 * | 7/2001 | Gisby | 379/266.01 |
| 6,526,041 B1 | 2/2003 | Shaffer et al. | |
| 6,563,916 B1 | 5/2003 | Deutsch et al. | |
| 6,614,896 B1 * | 9/2003 | Rao | 379/209.01 |
| 6,853,719 B2 | 2/2005 | McCormack et al. | |
| 7,912,208 B1 * | 3/2011 | Scott et al. | 379/265.09 |

* cited by examiner

*Primary Examiner* — Wesley Kim (57) ABSTRACT

A first voice call is put in an on-hold state in response to a resource being unavailable. In response to putting the first voice call in the on-hold state, a first data communication is transferred for delivery to the communication device. The first data communication drives the communication device to display an offer for a media service. A second data communication transferred by the communication device is received indicating that the offer has been accepted. The first data communication drives the communication device, in response to the acceptance of the offer, to transfer the second data communication and to retrieve media from the media service. The first voice call is terminated in response to receiving the second data communication. A second voice call is established with the communication device in response to the resource becoming available.

18 Claims, 5 Drawing Sheets

ENHANCED CALL ON-HOLD SERVICES

TECHNICAL BACKGROUND

Many businesses use call-handling or call-distributing systems as part of their customer interaction. For example, a utility company may use a call-handling system to receive service requests. A mail order catalog firm may use a call-handling system to take orders. A medical office may use a call-handling system to make appointments. Computer hardware and software firms may use a call-handling system to provide customer support.

When an incoming call is received at a call-handling system, it is typically assigned to the next available agent. The agent is then connected to the caller so that the agent may assist the caller. However, when all of the available agents are busy, the caller is placed on-hold until an agent is available. While on-hold, the caller must remain on the line in order to be ready to answer when the call is taken off hold.

OVERVIEW

A method of operating a call-handling system is disclosed. A first voice communication is transferred for delivery to a communication device over a first voice call. The first voice call is put in an on-hold state in response to a resource being unavailable. In response to putting the first voice call in the on-hold state, a first data communication is transferred for delivery to the communication device. The first data communication drives the communication device to display an offer for a media service. A second data communication transferred by the communication device is received indicating that the offer has been accepted. The first data communication drives the communication device, in response to the acceptance of the offer, to transfer the second data communication and to retrieve media from the media service. The first voice call is terminated in response to receiving the second data communication. A second voice call is established with the communication device in response to the resource becoming available. A second voice communication is transferred for delivery to the communication device over the second voice call.

A call-handling system is disclosed. A voice call system is configured to transfer a first voice communication for delivery to a communication device over a first voice call and to put the first voice call in an on-hold state in response to a resource being unavailable. A data system is configured to transfer a first data communication for delivery to the communication device in response the first voice call being put in the on-hold state. The first data communication drives the communication device to display an offer for a media service. The data system is configured to receive a second data communication transferred by the communication device indicating that the offer has been accepted. The first data communication drives the communication device, in response to the acceptance of the offer, to transfer the second data communication and to retrieve media from the media service. The voice call system is configured to terminate the first voice call in response to receiving the second data communication and to establish a second voice call with the communication device in response to the resource becoming available. The voice call system is also configured to transfer a second voice communication for delivery to the communication device over the second voice call.

DETAILED DESCRIPTION

Figure 1:
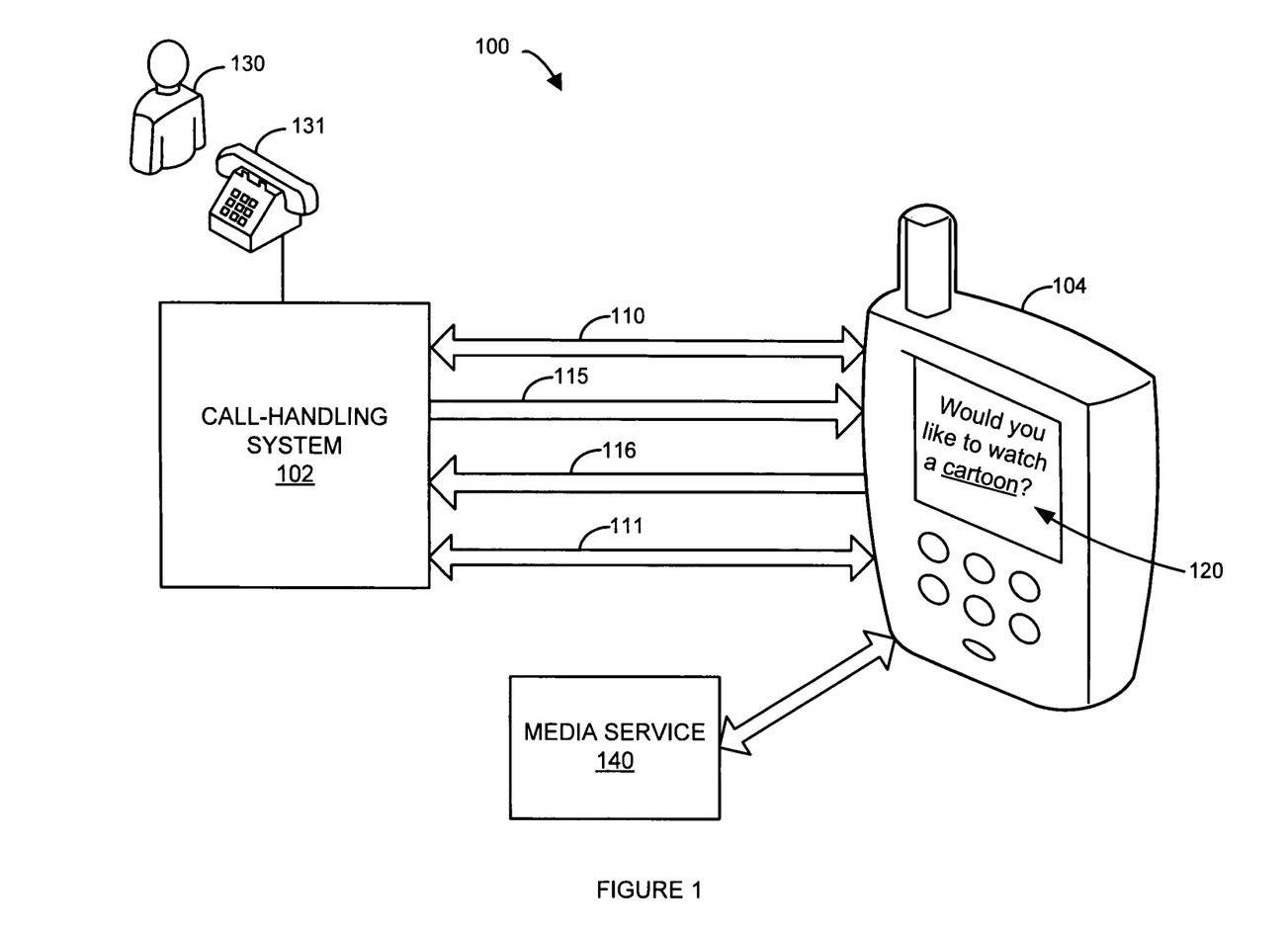
FIG. 1 is a block diagram illustrating a communication system with enhanced on-hold services.

FIG. 1 is a block diagram illustrating a communication system with enhanced on-hold services. In FIG. 1, communication system 100 comprises call-handling system 102, communication device 104, first voice call 110, second voice call 111, first data communication 115, second data communication 116, first offer 120, telephone 131, resource 130, and media service 140.

Telephone 131 is operatively coupled to call-handling system 102. Resource 130 may use telephone 131 for voice communication with communication device 104. Thus, resource 130 may be operatively coupled to communication device 104 for voice communication via call-handling system 102 and first voice call 110 or second voice call 111.

Call-handling system 102 may be a system or collection of systems or software that link or otherwise couple telephone 131 to communication device 104 via first voice call 110 and second voice call 111. Call-handling system 102 may be, or include, but is not limited to, computer telephony integration (CTI) technologies and applications such as intelligent private branch exchanges (PBXs), automatic call distributors (ACDs), fax servers, interactive voice response (IVR) systems, voice mail, messaging systems, and so on.

In an embodiment, resource 130 is a call agent that uses telephone 131 to exchange voice communication with communication device 104 via a network. However, other non-human devices and systems are possible resources. For example, resource 130 may be an audio IVR system.

Telephone 131 may be any device, system, combination of devices, or other such communication platform capable of exchanging voice communication with call-handling system 102 and communication device 104. Telephone 131 may be or be comprised of, for example, a standard telephone service telephone, an expanded function telephone, a mobile phone, a wireless phone, a wireless modem, a personal digital assistant (PDA), a computer system with a sound input, output, and an internet connection, a computer with a public switched telephone network (PSTN) connection and a modem, a computer with a network card, an access terminal, a computer with a headset, a voice over internet protocol (VoIP) phone, a voice over packet (VOP) phone, or a soft phone, as well as other types of devices or systems that can exchange voice communication with call-handling system 102 and thus communication device 104.

Communication device 104 may be any device, system, combination of devices, or other such communication platform capable of exchanging voice and data with call-handling system 102 and media with media service 140. Communication device 104 may be, for example, an expanded function telephone, a mobile phone, a wireless phone, a wireless modem, a personal digital assistant (PDA), a computer system with a sound input, output, and an internet connection, a computer with a public switched telephone network (PSTN) connection and a modem, a computer with a network card, an access terminal, a voice over internet protocol (VoIP) phone, a voice over packet (VOP) phone, or a soft phone, as well as other types of devices or systems that have a display and can exchange voice and data with call-handling system 102.

The first voice call 110 and the second voice call 111 may be established between call-handling system 102 and communication device 104 by any means known in the art for establishing voice communication. For example, the first voice call 110 or the second voice call 111 may be established via a conventional PSTN. The first voice call 110 or the second voice call 111 may be carried via a packet based network such as the internet. The network carrying the first voice call 110 or the second voice call 111 may be any network or collection of networks that couple, link, or otherwise operatively communicate voice communication between communication device 104 and call-handling system 102.

In an embodiment, the voice communication between call-handling system 102 and communication device 104 may be carried via data packets using voice over internet protocol or some other voice over packet protocol. The network carrying the first voice call 110 or the second voice call 111 may include secondary networks. For example, the network carrying the first voice call 110 or the second voice call 111 may include a backhaul network, a local network, a long distance network, a packet network, a PSTN, the internet, a wireless network, or any combination thereof, as well as other types of networks.

If resource 130 is unavailable to exchange voice communication with communication device 104, call-handling system 102 may place the first voice call 110 into an on-hold state. Call-handling system 102 may use the state of telephone 131 to determine if resource 130 is unavailable. For example, if telephone 131 is in the "off-hook" state, it may indicate that resource 130 is unavailable.

In response to putting the first voice call 110 in the on-hold state, call-handling system 102 transfers the first data communication 115 to communication device 104. The first data communication 115 causes communication device 104 to display a first offer 120. The first offer 120 is for a media service. The first offer 120 that communication device 104 displays may be in the form of text or an icon. The first offer 120 that communication device 104 displays may include a uniform resource locator (URL) or a hyperlink.

The user may then indicate that they desire to accept the offer. The user may make this indication by selecting indicia. For example, the user may accept the offer for the media service by selecting an icon. The icon may be selected by manipulating a pointer over the icon and then pressing an appropriate button. In another example, the user may accept the offer for the media service by manipulating a pointer over a URL or hyperlink and then tapping the screen or pressing an appropriate button.

When the user has indicated that they accept the offer for a media service, the contents of the first data communication 115 drives communication device 104 to send a second data communication 116 indicating this acceptance to call-handling system 102. In addition, in response to the user indicating they accept the offer, the contents of the first data communication 115 drives communication device 104 to retrieve media from media service 140. The services that may be retrieved include but are not limited to internet services, web browsing, email, pictures, picture messaging, video, video messaging, audio, voicemail, music, MP3's, ring tones, stock tickers, news alerts, and so on. Communication device 104 may retrieve media from media service 140 by any means known in the art. For example, communication device 104 may retrieve media from media service 140 using internet protocol packets over a network that includes the internet.

The first data communication 115 and the second data communication 116 may be or include a text message, an instant message, or a short message service (SMS) message. The first data communication 115 may include an URL, hyperlink, and other data. The selection of this URL or hyperlink may cause communication device 104 to send the second data communication 116 and retrieve media from media service 140. The selection of this URL or hyperlink may indicate the user is accepting the first offer 120 for a media service. The first data communication 115 may also be or include a software application, applet, or script.

The first data communication 115 or the second data communication 116 may be transferred between call-handling system 102 and communication device 104 by any means known in the art for data communication. For example, the first data communication 115 or the second data communication 116 may be transferred using analog modems that communicate via a conventional PSTN. The first data communication 115 or the second data communication 116 may be carried via a packet based network such as the internet. The network carrying the first data communication 115 or the second data communication 116 could be any network or collection of networks that couple, link, or otherwise operatively communicate data between communication device 104 and call-handling system 102.

In an embodiment, the first data communication 115 or the second data communication 116 may be carried via data packets using internet protocol (IP) or some other packet data protocol. The network carrying the first data communication 115 or the second data communication 116 may include secondary networks. For example, the network carrying the first data communication 115 or the second data communication 116 may include a backhaul network, a local network, a long distance network, a packet network, a PSTN, a wireless network, the internet, or any combination thereof, as well as other types of networks. The network carrying the first data communication 115 or the second data communication 116 may be the same or include the network that carries the first voice call 110 or the second voice call 111.

In an embodiment, in response to receiving the second data communication 116, call-handling system 102 may terminate the first voice call 110. Then, once resource 130 becomes available, call-handling system 102 may establish the second voice call 111. The second data communication 116 may contain information, such as a callback number, that allows call-handling system 102 to establish the second voice call 111. In an embodiment, call-handling system 102 stores a number received from caller ID information to allow call-handling system 102 to establish the second voice call 111. In an embodiment, call-handling system 102 uses a stored caller number from a user record to establish the second voice call 111.

Voice communication between resource 130 and communication device 104 may then be exchanged via the second voice call 111. In an embodiment, the first data communication 115 may additionally drive communication device 104 to terminate the media service in response to the second voice call 111.

Figure 2:
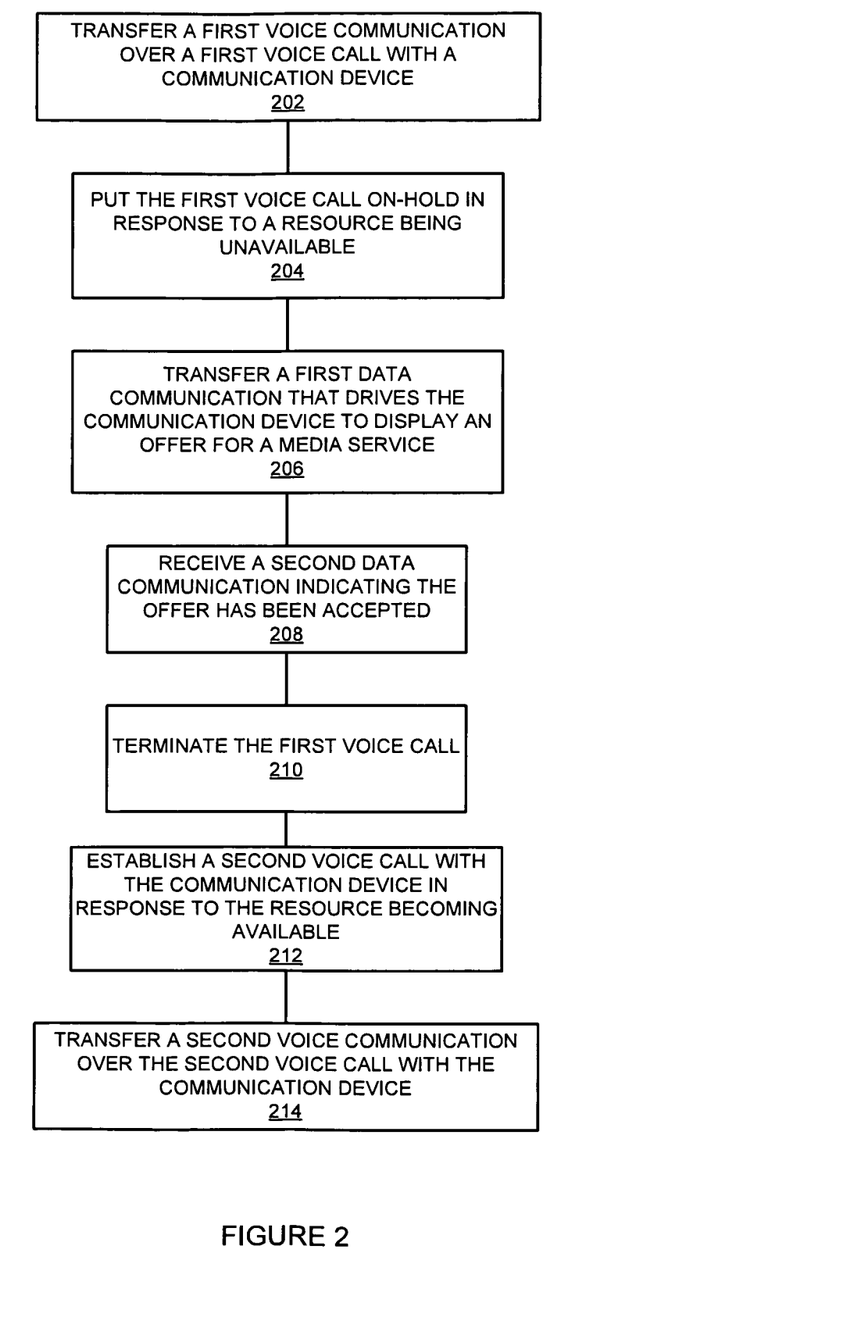
FIG. 2 is a flowchart illustrating a method of providing enhanced on-hold services.

FIG. 2 is a flowchart illustrating a method of providing enhanced on-hold services. The steps illustrated in FIG. 2 may be performed by communication system 100.

A first voice communication over a first voice call is transferred to a communication device (202). For example, call-handling system 102 may transfer voice communication to communication device 104 via the first voice call 110.

The first voice call is put on-hold in response to a resource being unavailable (204). For example, call-handling system 102 may place the first voice call 110 into an on-hold state in response to resource 130 being unavailable for voice communication.

A first data communication that drives the communication device to display an offer for a media service is transferred (206). This first data communication may also drive the communication device to retrieve the media service if the offer is accepted. For example, call-handling system 102 may transfer the first data communication 115 that causes communication device 104 to display the first offer 120. This first data communication may be may be or include a text message, an instant message, or an SMS message. This first data communication may include a URL, hyperlink, and other data.

A second data communication indicating that the offer has been accepted is received (208). For example, call-handling system 102 may receive the second data communication 116 that indicates the first offer 120 has been accepted. This second data communication may be or include a text message, an instant message, or an SMS message. This second message may include information, such as a callback number, that allows call-handling system 102 to reestablish voice communication with communication device 104.

The first voice call is terminated (210). The first voice call is terminated in response to receiving the second data communication. For example, the first voice call 110 may be terminated by call-handling system 102 in response to the second data communication 116. In another embodiment, the communication device is driven by the first data communication to terminate the first voice call.

A second voice call is established with the communication device in response to the resource becoming available (212). For example, call-handling system 102 may establish the second voice call 111 in response to resource 130 becoming available for voice communication. In an embodiment, the first data communication may additionally drive the communication device to terminate the media service in response to the second voice call.

A second voice communication is transferred over the second voice call with the communication device (214). For example, voice communication with resource 130 may be transferred by call-handling system 102 to communication device 104 via the second voice call 111.

Figure 3:
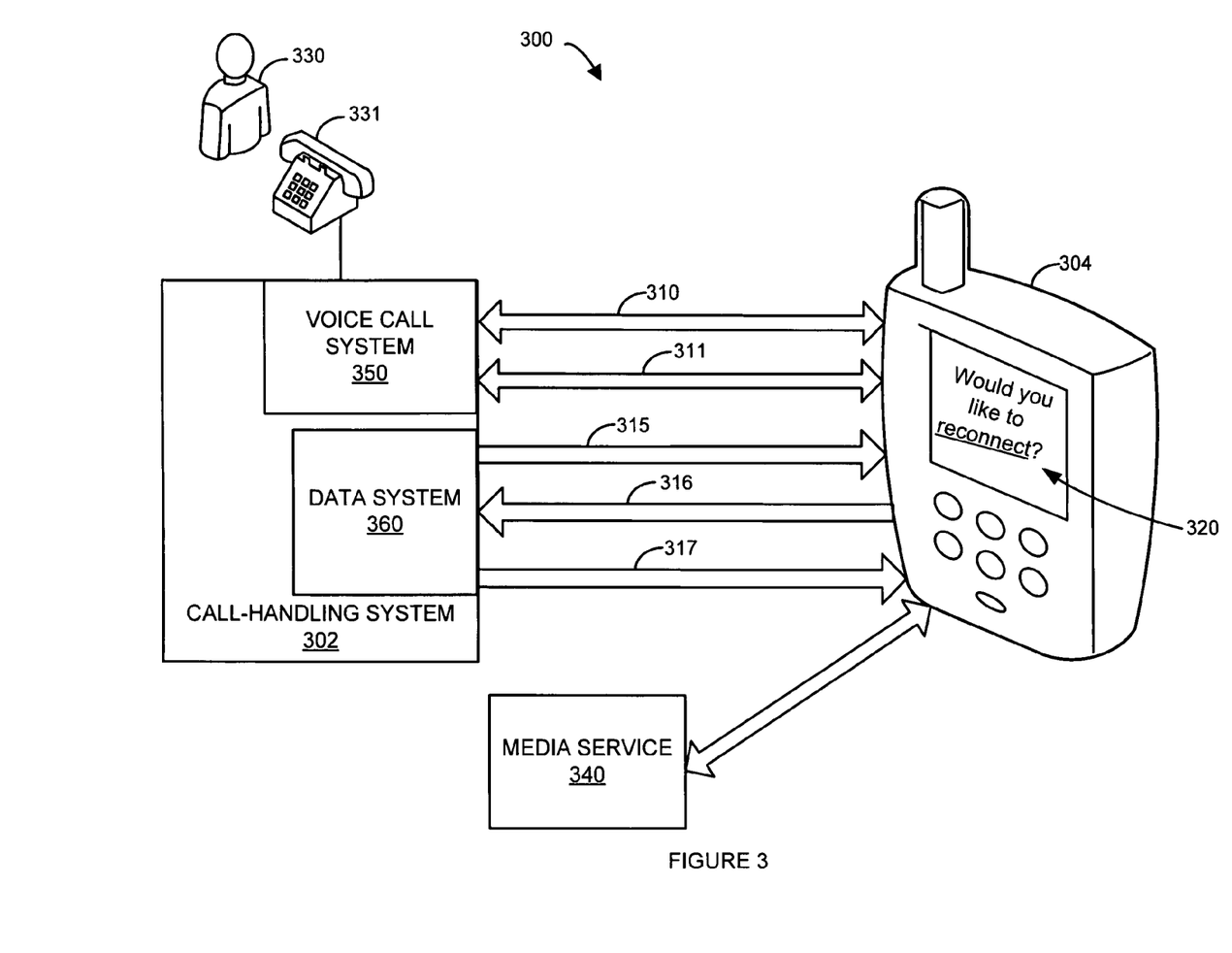
FIG. 3 is a block diagram illustrating a communication system with enhanced on-hold services.

FIG. 3 is a block diagram illustrating a communication system with enhanced on-hold services. In FIG. 3, communication system 300 comprises call-handling system 302, communication device 304, first voice call 310, second voice call 311, first data communication 315, second data communication 316, third data communication 317, second offer 320, telephone 331, resource 330, and media service 340. Call-handling system 302 includes voice call system 350 and data system 360.

Telephone 331 is operatively coupled to call-handling system 302. Specifically, telephone 331 is operatively coupled to voice call system 350. Resource 330 may use telephone 331 for voice communication with communication device 304. Thus, resource 330 may be operatively coupled to communication device 304 for voice communication via call-handling system 302, voice call system 350, and the first voice call 310 or the second voice call 311.

Call-handling system 302 and voice call system 350 may be a system or collection of systems or software that link or otherwise couple telephone 331 to communication device 304 via the first voice call 310 and the second voice call 311. Call-handling system 302 or voice call system 350 may be, or include, but is not limited to, CTI technologies and applications such as intelligent PBXs, ACDs, fax servers, IVR systems, voice mail, messaging systems, and so on.

In an embodiment, resource 330 is a call agent that uses telephone 331 to exchange voice communication with communication device 304 via a network. However, other non-human devices and systems are possible resources. For example, resource 330 may be an audio IVR system.

Telephone 331 may be any device, system, combination of devices, or other such communication platform capable of exchanging voice communication with call-handling system 302, voice call system 350, and communication device 304. Telephone 331 may be or be comprised of, for example, a standard telephone service telephone, an expanded function telephone, a mobile phone, a wireless phone, a wireless modem, a PDA, a computer system with a sound input, output, and an internet connection, a computer with a PSTN connection and a modem, a computer with a network card, an access terminal, a computer with a headset, a VoIP phone, a VOP phone, or a soft phone, as well as other types of devices or systems that can exchange voice communication with call-handling system 302 and thus communication device 304.

Communication device 304 may be any device, system, combination of devices, or other such communication platform capable of exchanging voice and data with call-handling system 302 (and thus voice call system 350 and data system 360) and media with media service 340. Communication device 304 may be, for example, an expanded function telephone, a mobile phone, a wireless phone, a wireless modem, a PDA, a computer system with a sound input, output, and an internet connection, a computer with a PSTN connection and a modem, a computer with a network card, an access terminal, a VoIP phone, a VOP phone, or a soft phone, as well as other types of devices or systems that have a display and can exchange voice and data with call-handling system 302.

The first voice call 310 and the second voice call 311 may be established between voice call system 350 (and thus call-handling system 302) and communication device 304 by any means known in the art for establishing voice communication. For example, the first voice call 310 or the second voice call 311 may be established via a conventional PSTN. The first voice call 310 or the second voice call 311 may be carried via a packet based network such as the internet. The network carrying the first voice call 310 or the second voice call 311 may be any network or collection of networks that couple, link, or otherwise operatively communicate voice communication between communication device 304 and voice call system 350.

In an embodiment, the voice communication between voice call system 350 and communication device 304 may be carried via data packets using voice over internet protocol or some other voice over packet protocol. The network carrying the first voice call 310 or the second voice call 311 may include secondary networks. For example, the network carrying the first voice call 310 or the second voice call 311 may include a backhaul network, a local network, a long distance network, a packet network, a PSTN, the internet, a wireless network, or any combination thereof, as well as other types of networks.

If resource 330 is unavailable to exchange voice communication with communication device 304, call-handling system 302 may place the first voice call 310 into an on-hold state. Call-handling system 302 may use the state of telephone 331 to determine if resource 330 is unavailable. For example, if telephone 331 is in the "off-hook" state, it may indicate that resource 330 is unavailable.

In response to putting the first voice call 310 in the on-hold state, call-handling system 302 transfers the first data communication 315 to communication device 304 using data system 360. The first data communication 315 causes communication device 304 to display a first offer (not shown). The first offer is for a media service. The first offer that communication device 304 displays may be in the form of text or an icon. The first offer that communication device 304 displays may include a URL or a hyperlink.

The user may then indicate that they desire to accept the offer. The user may make this indication by selecting indicia. For example, the user may accept the offer for the media service by selecting an icon. The icon may be selected by manipulating a pointer over the icon and then pressing an appropriate button. In another example, the user may accept the offer for the media service by manipulating a pointer over a URL or hyperlink and then tapping the screen or pressing an appropriate button.

When the user has indicated that they accept the offer for a media service, the contents of the first data communication 315 drives communication device 304 to send a second data communication 316 indicating this acceptance to call-handling system 302. Call-handling system 302 receives the second data communication 316 using data system 360. In addition, in response to the user indicating they accept the offer, the contents of the first data communication 315 drives communication device 304 to retrieve media from media service 340. The services that may be retrieved include but are not limited to internet services, web browsing, email, pictures, picture messaging, video, video messaging, audio, voicemail, music, MP3's, ring tones, stock tickers, news alerts, and so on. Communication device 304 may retrieve media from media service 340 by any means known in the art. For example, communication device 304 may retrieve media from media service 340 using internet protocol packets over a network that includes the internet.

The first, second, and third data communications 315-317 may be or include a text message, an instant message, or an SMS message. The first data communication 315 or the third data communication 317 may include a URL, a hyperlink, or other data. The selection of this URL or hyperlink may cause communication device 304 to send second data communication 316 and retrieve media from media service 340. The selection of this URL or hyperlink may indicate the user is accepting the first offer for a media service. The first data communication 315 or the third data communication 317 may also be or include a software application, applet, or script.

The first, second, or third data communications 315-317 may transferred between data system 360 (and thus call-handling system 302) and communication device 304 by any means known in the art for data communication. For example, the first, second, or third data communications 315-317 may be transferred using analog modems that communicate via a conventional PSTN. The first, second, or third data communications 315-317 may be carried via a packet based network such as the internet. The network carrying the first, second, or third data communications 315-317 could be any network or collection of networks that couple, link, or otherwise operatively communicate data between communication device 304 and data system 360. The network carrying the first, second, or third data communications 315-317 may comprise a wireless network.

In an embodiment, the first, second, or third data communications 315-317 may be carried via data packets using internet protocol or some other packet data protocol. The network carrying the first, second, or third data communications 315-317 may include secondary networks. For example, the network carrying the first, second, or third data communications 315-317 may include a backhaul network, a local network, a long distance network, a packet network, a PSTN, a wireless network, the internet, or any combination thereof, as well as other types of networks. The network carrying the first, second, or third data communications 315-317 may be the same or include the network that carries the first voice call 310 or the second voice call 311.

In an embodiment, in response to receiving the second data communication 316, call-handling system 302 may instruct voice call system 350 terminate first voice call 310. Then, once resource 330 becomes available, call-handling system 302 may transfer the third data communication 317 to communication device 304 using data system 360.

The third data communication 317 drives communication device 304 to display a second offer 320. The second offer 320 is an offer to place a second voice call 311 that will reconnect communication device 304 with voice call system 350 for voice communication. The second offer 320 that communication device 304 displays may be in the form of text or an icon. The second offer 320 that communication device 304 displays may include a URL or a hyperlink.

In an embodiment, the first data communication 315 drives communication device 304 to terminate the media service in response to the third data communication 317. In another embodiment, the third data communication 317 drives communication device 304 to terminate the media service.

The user may then indicate that they desire to accept the second offer 320. The user may make this indication by selecting indicia. For example, the user may accept the offer to place the second voice call 311 by selecting an icon. The icon may be selected by manipulating a pointer over the icon and then pressing an appropriate button. In another example, the user may accept the offer to place the second voice call 311 by manipulating a pointer over a URL or hyperlink and then tapping the screen or pressing an appropriate button.

When the user has indicated that they accept the second offer 320 to place the second voice call 311, the contents of the third data communication 317 drives communication device 304 to place the second voice call 311 to voice call system 350. The contents of the third data communication 317 drives communication device 304 to place the second voice call 311 in response to the acceptance. The user may indicate that they accept the second offer 320 to place the second voice call 311 either shortly after it is first displayed, or up to several days or weeks later.

Figure 4:
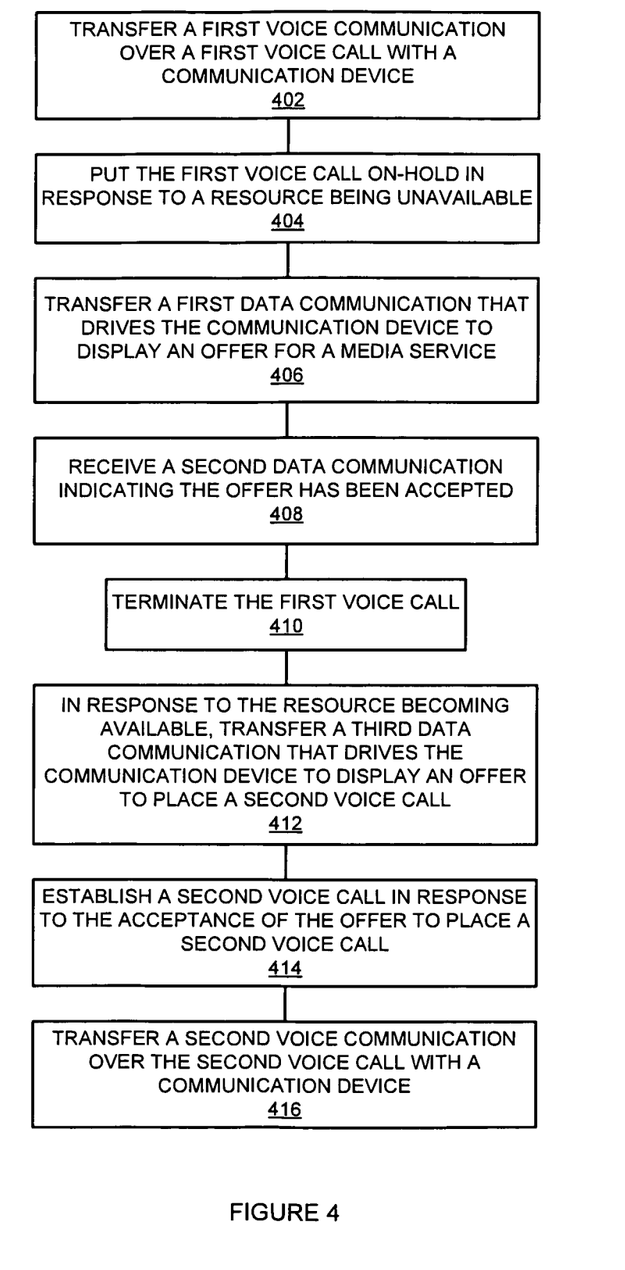
FIG. 4 is a flowchart illustrating a method of providing enhanced on-hold services.

FIG. 4 is a flowchart illustrating a method of providing enhanced on-hold services. The steps illustrated in FIG. 4 may be performed by communication system 100 or communication system 300.

A first voice communication over a first voice call is transferred to a communication device (402). For example, call-handling system 302 may transfer voice communication to communication device 304 via voice call system 350 and the first voice call 310.

The first voice call is put on-hold in response to a resource being unavailable (304). For example, call-handling system 302 may place the first voice call 310 into an on-hold state in response to resource 330 being unavailable for voice communication.

A first data communication that drives the communication device to display an offer for a media service is transferred (406). The first data communication may also drive the communication device to retrieve the media service if the offer is accepted. For example, call-handling system 302 may instruct data system 360 to transfer the first data communication 315 that causes communication device 304 to display an offer for a media service. This first data communication may be may be or include a text message, an instant message, or an SMS message. This first data communication may include a URL, hyperlink, and/or other data.

A second data communication indicating that the offer has been accepted is received (408). For example, call-handling system 302 may receive via data system 360 the second data communication 316 that indicates the offer for a media service has been accepted. This second data communication may be may be or include a text message, an instant message, or an SMS message. This second message may include information, such as a callback number, that allows call-handling system 302 to reestablish voice communication with communication device 304. In an embodiment, a number received from caller ID information is stored to allow the reestablishment of voice communication. In an embodiment, a stored caller number from a user record is used to reestablish voice communication.

The first voice call is terminated (410). The first voice call may be terminated in response to receiving the second data communication that indicated the offer for media service had been accepted. For example, the first voice call 310 may be terminated by call-handling system 302 in response to the second data communication 316. In another embodiment, the contents of the first data communication may cause the first voice call to be terminated. For example, the contents of the first data communication 315 may drive communication device 304 to terminate the first voice call 310.

In response to the resource becoming available, a third data communication is transferred to the communication device that drives the communication device to display an offer to place a second voice call (412). For example, in response to resource 330 becoming available, call-handling system 302 may instruct data system 360 to transfer third data communication 317 to communication device 304. The third data communication 317 may drive communication device 304 to display the second offer 320.

A second voice call is established in response to the acceptance of the offer to place a second voice call (414). For example, voice call system 350 may receive the second voice call 311 from communication device 304. Communication device 304 placed second voice call 311 in response to the user accepting the second offer 320 which was an offer to place the second voice call 311. In another example, call-handling system 302 may instruct voice call system 350 to place the second voice call 311 in response to the user accepting the second offer 320.

A second voice communication is transferred over the second voice call with the communication device (416). For example, voice communication with resource 330 may be transferred by voice call system 350 to communication device 304 via the second voice call 311.

The methods, systems, networks, and devices described above may be implemented with, contain, or be executed by one or more computer systems. The methods described above may also be stored on a computer readable medium. Many of the elements of communication network 100 and communication network 300 may be, comprise, or include computers systems. This includes, but is not limited to: call-handling system 102; communication device 104; resource 130; telephone 131; media service 140; call-handling system 302; communication device 304; resource 330; telephone 331; media service 340; voice call system 350; and, data system 360.

Figure 5:
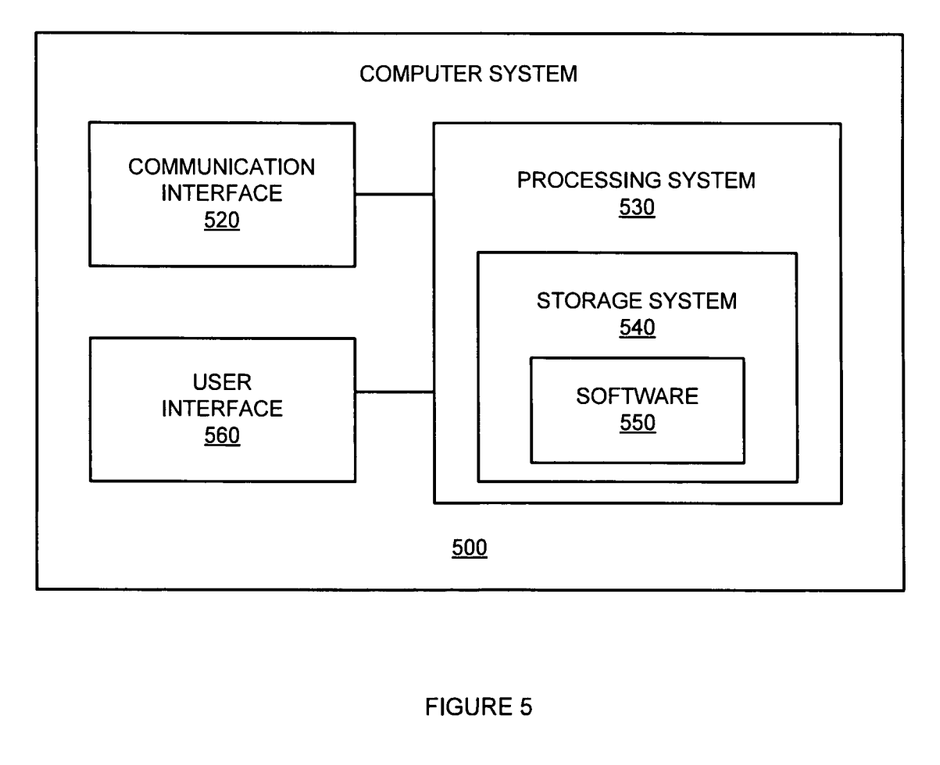
FIG. 5 is a block diagram illustrating a communication device that uses enhanced on-hold services.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a call-handling system, comprising:
   transferring a first voice communication for delivery to a communication device over a first voice call;
   putting the first voice call in an on-hold state in response to a resource being unavailable;
   in response to putting the first voice call in the on-hold state, transferring a first data communication for delivery to the communication device, wherein the first data communication drives the communication device to display a first offer, wherein the first offer is an offer for a media service;
   receiving a second data communication transferred by the communication device indicating that the first offer has been accepted, wherein the first data communication drives the communication device, in response to the acceptance of the first offer, to transfer the second data communication and to retrieve media from the media service, and wherein the second data communication includes information for establishing a second voice call;
   terminating the first voice call in response to receiving the second data communication;
   in response to the resource becoming available, transferring a third data communication for delivery to the communication device, wherein the third data communication drives the communication device to display a second offer that offers to place the second voice call, and wherein the communication device places the second voice call in response to acceptance of the second offer; and establishing the second voice call with the communication device based on the information included in the second data communication and transferring a second voice communication for delivery to the communication device over the second voice call.

2. The method of claim 1, wherein establishing the second voice call comprises placing the second voice call to the communication device.

3. The method of claim 2, wherein the first data communication drives the communication device to terminate the media service in response to the second voice call.

4. The method of claim 1, wherein the first data communication drives the communication device to terminate the media service in response to the third data communication.

5. The method of claim 1, wherein the third data communication drives the communication device to terminate the media service.

6. The method of claim 1, wherein the first data communication comprises one of a text message, an instant message, and a short message service message.

7. The method of claim 1, wherein the first data communication includes a uniform resource locator for the media service.

8. The method of claim 1, wherein the media comprises video.

9. The method of claim 1, wherein the communication device comprises a wireless communication device.

10. A call-handling system, comprising:

a voice call system configured to transfer a first voice communication for delivery to a communication device over a first voice call and to put the first voice call in an on-hold state in response to a resource being unavailable;

a data system configured to transfer a first data communication for delivery to the communication device in response the first voice call being put in the on-hold state, wherein the first data communication drives the communication device to display a first offer;

wherein the first offer is an offer for a media service;

wherein the data system is configured to receive a second data communication transferred by the communication device indicating that the first offer has been accepted, wherein the second data communication includes information for establishing a second voice call;

and wherein the first data communication drives the communication device, in response to the acceptance of the first offer, to transfer the second data communication and to retrieve media from the media service;

the data system configured to, in response to the resource becoming available, transfer a third data communication for delivery to the communication device, wherein the third data communication drives the communication device to display a second offer that offers to place the second voice call, and wherein the communication device places the second voice call in response to acceptance of the second offer; and wherein the voice call system is configured to terminate the first voice call in response to receiving the second data communication and to establish the second voice call with the communication device based on the information included in the second data communication and transfer a second voice communication for delivery to the communication device over the second voice call.

11. The call-handling system of claim 10, wherein the voice call system is configured to establish the second voice call by placing the second voice call to the communication device.

12. The call-handling system of claim 11, wherein the first data communication drives the communication device to terminate the media service in response to the second call.

13. The call-handling system of claim 10, wherein the first data communication drives the communication device to terminate the media service in response to the third data communication.

14. The call-handling system of claim 10, wherein the third data communication drives the communication device to terminate the media service.

15. The call-handling system of claim 10, wherein the first data communication comprises at least one of a text message, and instant message, and a short message service message.

16. The call-handling system of claim 10, wherein the first data communication includes a uniform resource locator for the media service.

17. The call-handling system of claim 10, wherein the media comprises video.

18. The call-handling system of claim 10, wherein the communication device comprises a wireless communication device.

* * * * *